United States Patent
Wang

(10) Patent No.: US 8,442,146 B2
(45) Date of Patent: May 14, 2013

(54) APPARATUS AND METHODS FOR REDUCING CHANNEL ESTIMATION NOISE IN A WIRELESS TRANSCEIVER

(75) Inventor: Michael Mao Wang, San Diego, CA (US)

(73) Assignee: Qualcomm Incorporated, San, Diego, CA (US)

( * ) Notice: Subject to any disclaimer, the term of this patent is extended or adjusted under 35 U.S.C. 154(b) by 0 days.

(21) Appl. No.: 12/911,650

(22) Filed: Oct. 25, 2010

(65) Prior Publication Data

US 2011/0116533 A1  May 19, 2011

Related U.S. Application Data

(63) Continuation of application No. 11/303,485, filed on Dec. 15, 2005, now Pat. No. 7,835,460.

(60) Provisional application No. 60/731,015, filed on Oct. 27, 2005.

(51) Int. Cl.
  *H04L 27/10*  (2006.01)
(52) U.S. Cl.
  USPC .......................................................... 375/278
(58) Field of Classification Search .................. 375/260, 375/278, 346, 349; 369/95
  See application file for complete search history.

(56) References Cited

U.S. PATENT DOCUMENTS

| | | | |
|---|---|---|---|
| 5,479,446 A | 12/1995 | Mourot | |
| 6,442,129 B1 | 8/2002 | Yonge, III et al. | |
| 6,686,857 B2 * | 2/2004 | LoCasale et al. | 341/110 |
| 6,862,567 B1 * | 3/2005 | Gao | 704/228 |
| 6,907,092 B1 * | 6/2005 | Yakhnich et al. | 375/346 |
| 7,835,460 B2 | 11/2010 | Wang | |
| 2004/0091057 A1 * | 5/2004 | Yoshida | 375/260 |
| 2005/0271016 A1 * | 12/2005 | Kim et al. | 370/332 |
| 2006/0072493 A1 * | 4/2006 | Ginzburg et al. | 370/328 |
| 2006/0171283 A1 * | 8/2006 | Vijayan et al. | 369/94 |
| 2006/0198454 A1 * | 9/2006 | Chung et al. | 375/260 |
| 2006/0291578 A1 * | 12/2006 | Singh et al. | 375/260 |
| 2007/0097853 A1 | 5/2007 | Khandekar et al. | |
| 2007/0097889 A1 | 5/2007 | Wang et al. | |

(Continued)

FOREIGN PATENT DOCUMENTS

| | | |
|---|---|---|
| EP | 0966113 A1 | 12/1999 |
| EP | 1376963 A2 | 1/2004 |
| WO | WO0209297 | 1/2002 |

OTHER PUBLICATIONS

International Search Report and Written Opinion—PCT/US06/060238—International Search Authority, European Patent Office—Mar. 14, 2007.

*Primary Examiner* — Jaison Joseph
(74) *Attorney, Agent, or Firm* — Fulbright & Jaworski L.L.P.

(57) ABSTRACT

Apparatus and methods for use in a wireless communication system are disclosed for reducing channel estimation noise in a device such as a wireless transceiver. A disclosed apparatus includes a processor that determines a channel activity portion and a noise portion of a channel estimation. The processor also determines a threshold noise level based on channel estimate values in the noise portion of the channel estimation. The processor compares channel estimate energy values in the channel estimation to the threshold noise level and sets each of the channel estimate energy values being less than the threshold noise level to a predetermined value such as zero in order to reduce or eliminate the noise. Similar methods are also disclosed.

81 Claims, 5 Drawing Sheets

U.S. PATENT DOCUMENTS

| | | |
|---|---|---|
| 2007/0097908 A1 | 5/2007 | Khandekar et al. |
| 2007/0097922 A1 | 5/2007 | Parekh et al. |
| 2007/0165738 A1 | 7/2007 | Barriac et al. |
| 2007/0189423 A1* | 8/2007 | Fimoff et al. ................. 375/340 |
| 2007/0211616 A1 | 9/2007 | Khandekar et al. |
| 2007/0291641 A1* | 12/2007 | Pan et al. ...................... 370/210 |
| 2008/0248796 A1* | 10/2008 | Oh et al. ........................ 455/423 |

* cited by examiner

APPARATUS AND METHODS FOR REDUCING CHANNEL ESTIMATION NOISE IN A WIRELESS TRANSCEIVER

RELATED APPLICATIONS

This application is a continuation application of U.S. patent application Ser. No. 11/303,485, issued as U.S. Pat. No. 7,835,460, filed Dec. 15, 2005, which claims benefit of priority under 35 U.S.C. §119(e) to U.S. Provisional Patent Application No. 60/731,015, filed Oct. 27, 2005, the disclosure of which is hereby incorporated herein by reference in its entirety.

FIELD OF THE INVENTION

The present disclosure relates to apparatus and methods for reducing channel estimation noise in a wireless communication transceiver and, more particularly, to apparatus and methods for setting values of the channel estimation less than a determined noise density to a predetermined value when those values are less than the noise density in order to reduce the overall channel estimation noise.

BACKGROUND OF THE INVENTION

In certain wireless communication systems, such as those employing Orthogonal Frequency Division Multiplexing (OFDM), channel estimation of received communication signals has a profound effect on system performance. For example, wireless transceivers use the channel estimation for demodulating the received data and for timing tracking. Therefore, it is important that the channel estimation be accurate. Variables such as noise/interference (collectively referred to herein as "noise"), however, can adversely affect channel estimation quality. Examples of types of noise/interference include inter-cell/network interference (i.e., noise generated as a result of interfering signals within a network or between different systems (e.g., OFDM and CDMA)) and tone jammer interference (a single tone (frequency) having a narrow bandwidth that interferes with one of the carrier frequencies of a transmitted signal). Accordingly, it is beneficial to attempt to reduce the channel estimation noise, thereby increasing the channel estimation immunity to noise/interference in order to achieve better quality channel estimation.

SUMMARY OF THE INVENTION

According to a disclosed example, a method for reducing noise in channel estimation of a communication signal includes determining a channel activity portion of a channel estimation and a noise portion of the channel estimation and determining a noise energy density value of channel estimates occurring during the noise portion of the channel estimation. The method also includes comparing energy values of channel estimates for at least a portion of the channel estimation to the noise energy density value, and setting channel estimate values to a predetermined value for each channel estimate having an energy value less than the noise energy density value.

According to another disclosed example, a method for reducing noise in a communications channel estimation includes determining a channel activity portion and a noise portion of a channel estimation and determining a threshold noise level based on channel estimate values in the noise portion of the channel estimation. The method further includes comparing at least a portion of channel estimate values in the channel estimation to the threshold noise level, and setting each of the at least a portion of channel estimate energy values being less than the threshold noise level to a predetermined value.

In yet another disclosed example, a computer readable medium having instructions stored thereon is disclosed where the stored instructions, when executed by a processor, cause a processor to perform a method to reduce noise in a communications channel estimation, the method comprising: determining a channel activity portion of a channel estimation and a noise portion of the channel estimation; determining a noise energy density value of channel estimates occurring during the noise portion of the channel estimation; comparing energy values of channel estimates for at least a portion of the channel estimation to the noise energy density value; and setting channel estimate values to a predetermined value for each channel estimate having an energy value less than the noise energy density value.

A computer readable medium having instructions stored thereon, the stored instructions, when executed by a processor, cause the processor to perform a method to reduce noise in a communications channel estimation, the method comprising: determining a channel activity portion and a noise portion of a channel estimation; determining a threshold noise level based on channel estimate values in the noise portion of the channel estimation; comparing at least a portion of channel estimate values in the channel estimation to the threshold noise level; and setting each of the at least a portion of channel estimate energy values being less than the threshold noise level to a predetermined value.

A computer readable medium having instructions stored thereon, the stored instructions, when executed by a processor, cause the processor to perform a method to reduce noise in a communications channel estimation which includes determining a channel activity portion and a noise portion of a channel estimation, determining a threshold noise level based on channel estimate values in the noise portion of the channel estimation, comparing at least a portion of channel estimate values in the channel estimation to the threshold noise level, and setting each of the at least a portion of channel estimate energy values being less than the threshold noise level to a predetermined value.

In still another disclosed example, a transceiver apparatus is disclosed that is configured to reduce noise in a channel estimation. The transceiver includes a channel estimator processor configured to: determine a channel activity portion of a channel estimation and a noise portion of the channel estimation; determine a noise energy density value of channel estimates occurring during the noise portion of the channel estimation; compare energy values of channel estimates for at least a portion of the channel estimation to the noise energy density value; and set channel estimate values to a predetermined value for each channel estimate having an energy value less than the noise energy density value.

According to another disclosed example, a transceiver apparatus is configured to reduce noise in a channel estimation. The transceiver apparatus includes a channel estimator processor configured to: determine a channel activity portion and a noise portion of a channel estimation; determine a threshold noise level based on channel estimate values in the noise portion of the channel estimation; compare at least a portion of channel estimate values in the channel estimation to the threshold noise level; and set each of the at least a portion of channel estimate energy values being less than the threshold noise level to a predetermined value.

In yet another example, an apparatus for resolving timing in a wireless communication device is disclosed. The apparatus includes means for determining a channel activity portion of a channel estimate and a noise portion of the channel estimate; means for determining a noise energy density of the channel estimate occurring during the noise portion of the channel estimate; means for determining whether the energy of at least a portion of kth channel estimates are less than the value of the noise energy density; and means for setting the channel estimate to a predetermined value (e.g., 0) when the energy of a channel estimate is less than the value of the noise energy density.

DETAILED DESCRIPTION OF THE INVENTION

In order to reduce channel estimation noise, the present application discloses apparatus and methods that first divide a time-domain channel estimation into different zones. In certain communication systems, such as an OFDM system, a time domain channel estimation may be derived, for example, after frequency domain pilot channels are descrambled and transformed into a time-domain channel estimation, which typically has a P number or points of channel estimates. Thus, according to the present disclosure, a P-point time-domain channel estimation is divided into two zones: a channel activity zone and a noise/interference zone (or noise zone). A reason for using a time-domain channel estimation for determining the zones, as opposed to the frequency domain, for example, is that the channel activity typically occurs temporally in a particular portion of the channel estimation, and thus other portions of the channel estimation can be more accurately relied upon as noise/interference zones (i.e., zone where significant channel activity is not occurring). In the frequency domain, easily separating noise from channel activity is not possible, especially in OFDM systems, for example, which utilize multiple carrier frequencies for data transmission. Moreover, with tone jammer interference, the noise is very specifically located on a single tone, which would make it difficult to isolate in the frequency domain, whereas in time domain the noise is spread out over time.

Figure 1:
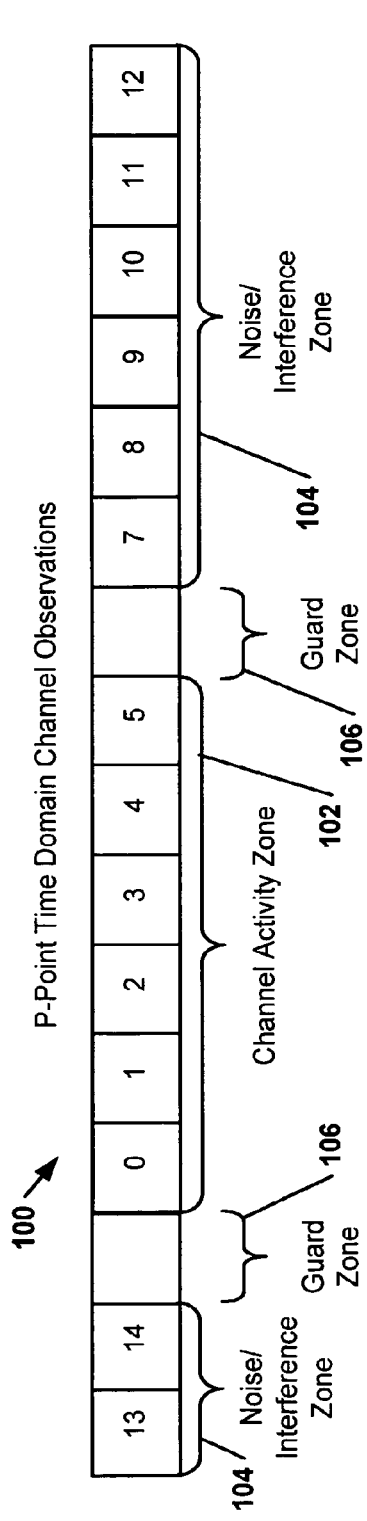
FIG. 1 is an illustration of an exemplary channel estimation having particular zones for use in a wireless communication system.

FIG. 1 is an example of a P-point time domain channel estimation according to the present disclosure. As illustrated the channel estimation 100 is divided into a channel activity zone 102 and noise/interference zones 104. Each of the zones 102 or 104 encompasses a number of channel estimates, grouped into number bins for convenience of illustration. Additionally, the channel estimate 100 may further include inserted guard zones 106, which serve as a buffer between the channel activity zone 104 and noise/interference zones 106. It is noted that the channel estimation scheme illustrated in FIG. 1 is only an example and that many different zoning schemes could be employed or envisioned to delineate portions of the channel estimation predominately consisting of channel activity and portions predominately consisting of noise. Furthermore, it is noted that actual implementations of such delineating zoning schemes depend on timing tracking schemes, length of channel estimate, and the maximum channel spread.

Once zones of channel and noise activity are demarcated as exemplified in FIG. 1, an example of the disclosed methods and apparatus further determine the noise/interference energy density based on those samples located within the noise/interference zones of the channel estimation. This determination provides an estimate of how large the noise variance is in the channel estimation, without the influence of the main channel activity. It is noted, however, that using only the noise/interference zones of the channel estimation is based on the assumption that channel activity will occur in the channel activity zone as long as timing tracking is accurate. Ignoring the channel activity zone in determining the noise/interference energy density provides a more accurate determination of the actual noise variance. That is, estimation of noise variance in the channel activity zone would result in an overestimation of the noise variance since the channel energy would be falsely estimated as part of the noise variance Quantitatively, the noise energy density estimate w can be determined according to the following equation:

$$\hat{w} = \frac{1}{N} \sum_{k=0}^{N-1} |\hat{c}_k|^2 \qquad (1)$$

where ck is the $k^{th}$ channel estimate within the noise/interference zone, N is the number of estimates in the noise/interference zone. It is noted that the values of k encompass only the channel estimates within the noise/interference zone.

As mentioned previously, two common noise/interferences are tone jammer interference and inter-cell/network interference. The tone jammer interference energy is evenly spread over the time of the channel estimation. This is due to the fact that a sharp tone in the frequency domain results in energy spread in the time domain.

For inter-cell/network interference, a uniform energy density is also expected due to the pilot scrambling/descrambling because of the fact that the use of a pseudo-random scrambling sequence in the frequency domain results in a spread in the time domain. Furthermore, the interfering cell/network uses a different scrambling sequence. Accordingly, the descrambling of the currently serving cell results in de-spreading of the current cell pilot while the interfering cell pilot remains spread, i.e., a uniform energy density in time domain.

Based on the characteristics of tone jammer interference and inter-cell/network interference, the noise energy density inside the channel activity zone (e.g., 102) can be assumed to be the same as in the noise/interference zones (e.g., 104). Accordingly, the presently disclosed methods and apparatus compare the channel estimate energy at each $k^{th}$ estimate (e.g., $|\hat{c}_k|^2$) of the P number of points in the channel estimation to the noise energy density determination of equation (1) above. If the channel estimate energy is greater than the noise energy density the channel estimate is left at its current value. Alternatively, if the channel estimate energy is less than the noise energy density the channel estimate value is set to a predetermined value. In one example, the predetermined value is zero such that the channel estimate is zeroed out as a result for those channel estimates having an energy less than the predetermined threshold of the noise energy density. In one example, this comparison and setting of channel estimates is performed over a portion or portions of the channel estimate, such as just over the channel estimates within the noise/interference zones.

Figure 2:
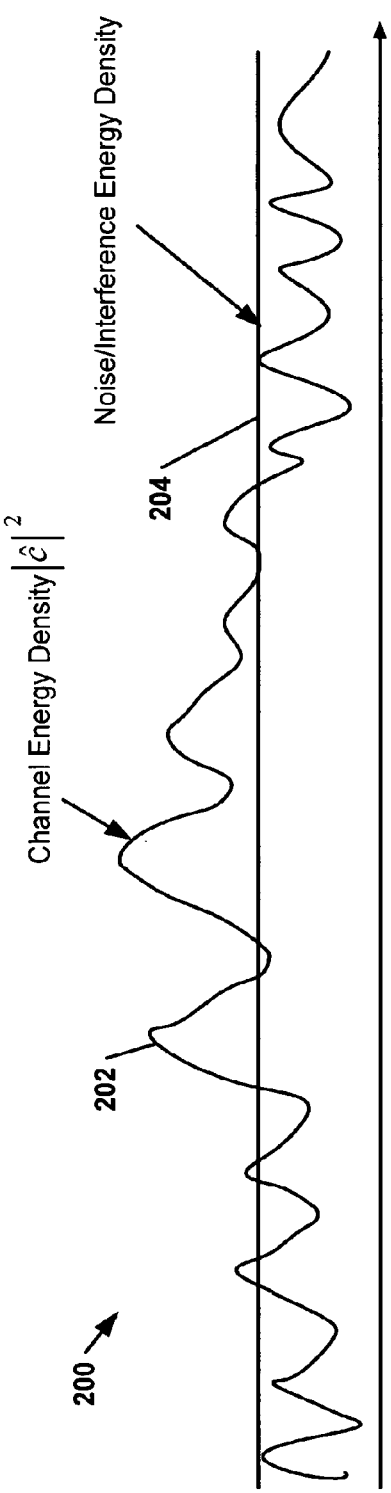
FIG. 2 is an exemplary plot of channel energy densities in a wireless communication system.

In multi-path communication systems, however, it is common that some of the signal energy may arrive earlier or later than the maximum channel energy in the channel activity zone or that the maximum channel energy may not occur fully in the channel activity zone. Accordingly in such cases, it is beneficial to perform the comparison operation over every channel estimate. As an example, FIG. 2 illustrates an exemplary plot 200 of channel energy densities in a wireless communication system. As shown, the channel energy density 202 rises above the noise/interference energy density threshold 204 in a portion of the channel roughly corresponding to the channel activity zone 102 shown in FIG. 1. Thus, only those values of the channel energy density 202 rising above the threshold 204 will be used as meaningful values for channel estimation. The remaining channel estimates are set to a predetermined value to below the threshold amount to reduce the noise/interference for channel estimation (e.g., zeroed out to remove noise).

Further, the noise energy density calculated in equation (1) above may not reflect the accurate noise energy density value, but either be an over or under estimate. Thus, a predetermined constant $\lambda$ can be set and multiplied by the noise energy density value w to adjust or weight the value to an accurate comparison threshold. Quantitatively, the comparison test described above can be expressed as:

$$\hat{c}'_k = \begin{cases} \hat{c}_k & |\hat{c}_k|^2 > \lambda w \\ 0 & |\hat{c}_k|^2 \leq \lambda w \end{cases}, k = 0, 1, \ldots, P-1 \quad (2)$$

where the values of k are over the entire P number of channel estimates and w is estimated using Equation (1) and $\lambda$ is a constant that is determined by the false detection probability (i.e., the probability that an actual channel tap is falsely removed as noise). It is noted that too large of a $\lambda$ value may cause too much useful channel energy being falsely removed resulting in degradation in the channel estimation quality. Conversely, too small of a $\lambda$ value results in insufficient removal of noise and does not significantly help improve channel estimation quality. It is noted that in the example discussed previously of comparing over only a portion of the channel estimates, the k values of equation (2) would be set, accordingly.

It is further noted that in the case where the channel estimates having a length P, for example, are not sufficiently longer than the maximum channel length, a clean separation between the channel activity zone and the noise/interference zones will not exist. Rather, the channel activity and noise/interference zones overlap in such cases. Accordingly in such cases, the noise energy density will tend to always be an over-estimate of the actual noise energy density. The predetermined constant $\lambda$ may be adjusted to compensate for this—over estimation, based on the particular channel characteristics.

In another example where the channel zones are not well separated, or the number of N samples for calculating the noise energy density w is small (see equation (1) above), the value of w In such case, an exemplary methodology using values from one or more previous channel estimations to provide more data in which to improve the calculation of the noise energy density value. This calculation may be performed using the following modification of equation (1):

$$\hat{w} = \frac{1}{M} \sum_{i=1}^{M} \alpha^i \frac{1}{N} \sum_{k=0}^{N-1} |\hat{c}_k|^2 \quad (3)$$

where M is the number of previous channel estimates and a is a weighting coefficient for respective 1 to M number previous estimation where $$\sum_{i=1} \alpha^i = 1$$

(i.e., the sum of all the weighting coefficients adds to one (1)). In an example, the weighting coefficients for more recent previous channel estimates are larger than those farther back in time to accord more weight to estimates that are more recent.

Figure 3:
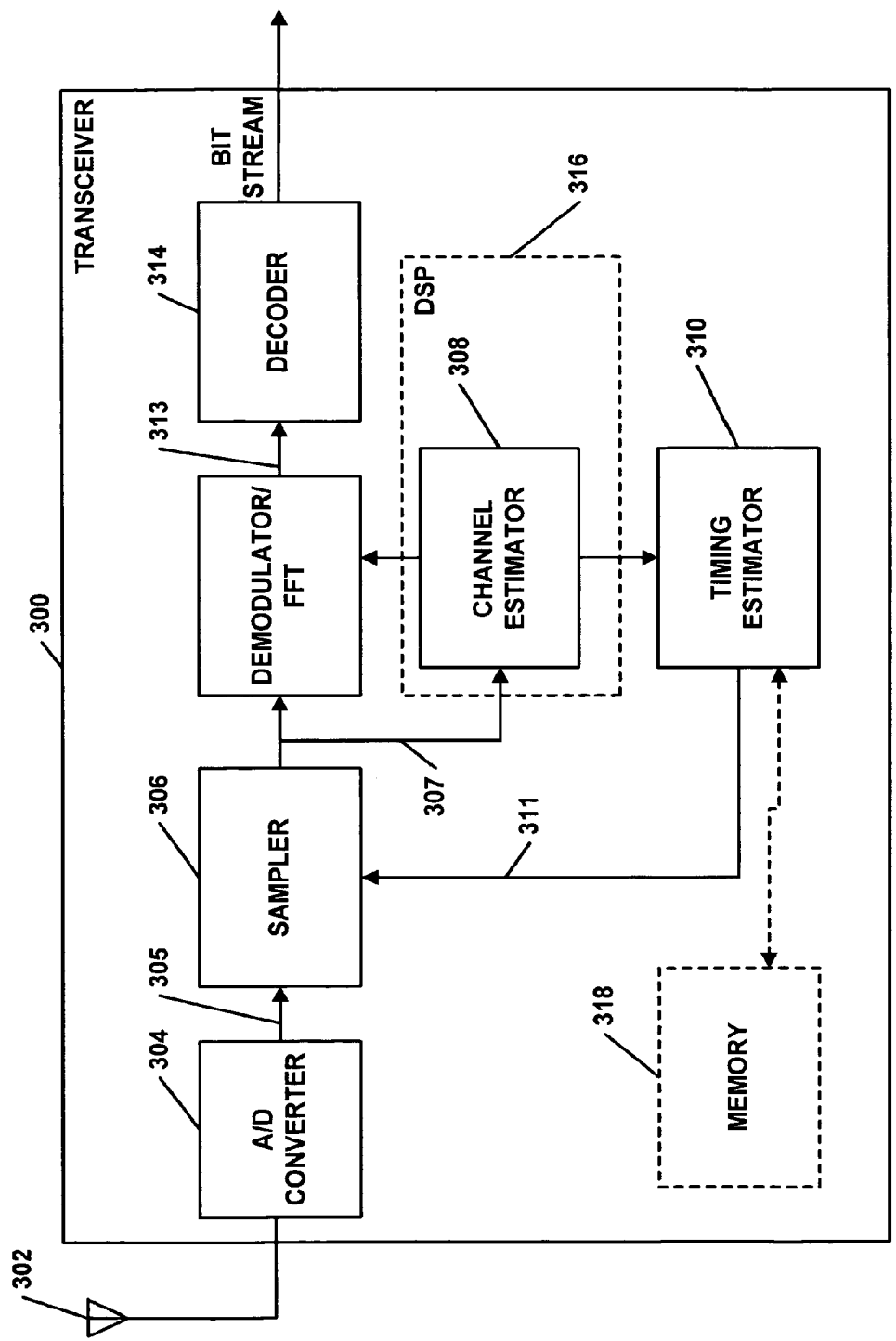
FIG. 3 is a block diagram of a transceiver employing an exemplary apparatus for reducing noise in a channel estimation according to the present disclosure.

FIG. 3 is a block diagram of an exemplary transceiver 300 that may employ apparatus to effect the above-described methodology for reducing estimation noise/interference. As illustrated, the transceiver 300 includes an antenna 302 to receive a transmitted wireless signal. The antenna 302 delivers the signal to an analog-to-digital (A/D) converter 304 that converts the analog wireless signal to a digital signal 305. A/D converter 304 outputs the digital signal 305 to a sampler 306 or similarly suitable device. Regardless, sampler 306 is the portion of the transceiver 300 that effects a timing window for sampling the subcarriers within the digital signal 305. The output of the sampler 306, which is a synchronized digital signal 307, is input to both a channel estimator 308 and a demodulator/FFT 312.

The channel estimator 308 performs descrambling and transformation using the frequency domain pilot tones inserted by the transmitter (not shown) into the digital signal. In addition, the channel estimator is configured to effect the presently methodology for reducing noise/interference disclosed herein.

After reducing the noise/interference, channel estimator 308 effects channel estimation that yields an impulse response and frequency response of each channel. These impulse and frequency response results 309 are transmitted to demodulator/FFT 312 and may also be sent to a timing estimator 310 for calculation of a timing offset or the start of timing for sampling of the channel. The timing estimator 310, in turn, outputs timing data 311 to the sampler 306 for setting the timing of the sampling window of sampler 306.

It is noted that channel estimator 308 may be implemented as hardware, software, or firmware within a transceiver apparatus, such as transceiver 300. Additionally, in the case of a software implementation, the transceiver 300 could include an integrated circuit, such as an Application Specific Integrated Circuit (ASIC) including or interfacing with a computer readable medium having instructions stored thereon (such as a memory 318, for example), the stored instructions, when executed by a processor (e.g., estimator 308), causing the processor to execute the methodology described in this disclosure. As another example, the channel estimator 308 could be implemented as a separator processor or could be implemented by a Digital Signal Processor (DSP) 316 within the transceiver 300.

As shown in FIG. 3, the output of the sampler 306 also feeds the signal 307 to demodulator/FFT 312, for demodulating the signal 307, which was modulated by the transmitter (not shown) according to one of a number of known techniques. After demodulation, the resultant demodulated signal 313 is decoded by decoder 314 and output as a serial bit stream for use by a mobile communication device in which the transceiver is housed, such as a mobile phone device or a personal data assistant, as examples.

Figure 4:
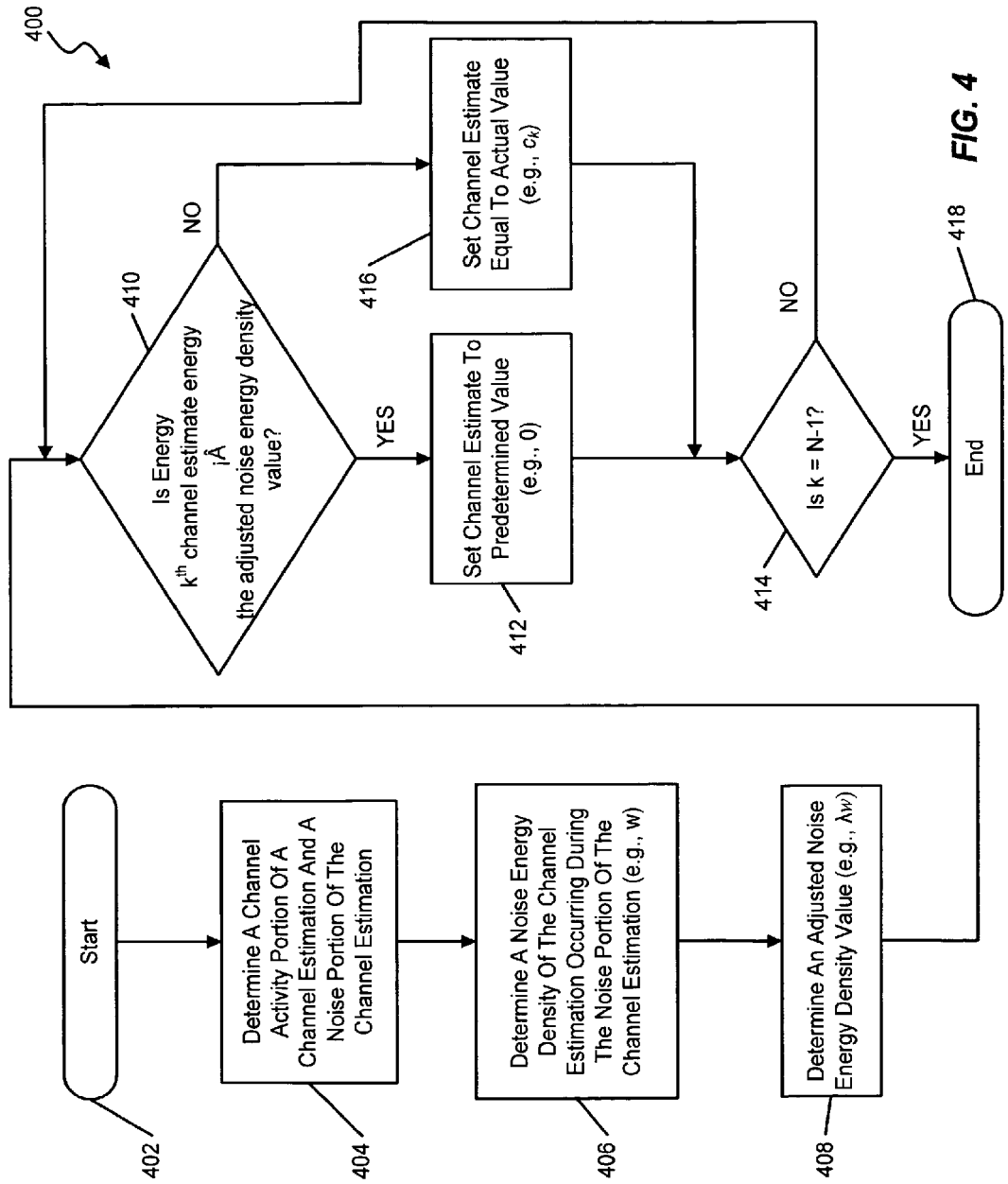
FIG. 4 is a flow diagram of a disclosed exemplary method for reducing noise in a channel estimation.

FIG. 4 illustrates a flow diagram of an exemplary method for reducing noise/interference in a channel estimate. The illustrated process 400 starts at a block 402. Flow proceeds to block 404, where a channel activity portion of a channel estimation and a noise portion of the channel estimation are determined. The channel estimator 308 of FIG. 3 may perform the process of block 404, for example. Next, a noise energy density of the channel estimation occurring during the noise portion of the channel estimate (e.g., w) is determined as illustrated in block 406. Channel estimator 308, as an example, may also perform the determination in block 406. Furthermore, the method by which the determination of the noise energy density is made may include the calculation of equation (1). Of further note, the noise energy density can be considered a noise threshold level as was previously explained with respect to FIG. 2.

After the noise threshold is determined, an adjusted noise energy density value (e.g., λw) 408 may be determined to account or adjust for any over or underestimation in the noise energy density determined in block 406. According to one example, the adjusted noise energy density could be the same value as the originally calculated noise energy density, such as is the predetermined constant λ has a value of one (1). Alternatively, the process of 408 could be eliminated if no adjusted noise energy density is utilized. In such case, the process would simply flow from block 406 to a decision block 410. The processes of blocks 406 and 408 may implemented by channel estimator 308, as an example. The channel estimator 308 or some other processor, such as DSP 316, may determine the predetermined value λ.

In decision block 410 a determination is made whether the energy density of a kth channel estimate (e.g., $|\hat{c}_k|^2$)) is less than or equal to the adjusted noise energy density (e.g., λw). Alternatively, if simply the original noise energy density is utilized with the deletion of block 408, the comparison of block 410 is made between the energy density of a ktl' channel estimate (e.g., $|\hat{c}_k|^2$)) and the noise energy density (e.g., w). The process of block 410 may utilize the relationship of equation (2) discussed previously and may be implemented by channel estimator 308.

If the decision of block 410 is affirmative, indicating that the energy density of the channel estimate if equal to or below the noise energy density threshold (204), flow proceeds to block 412 where the channel estimate (e.g., $\hat{c}_k$) is set to a predetermined value, such as zero (0). Flow proceeds from block 412 to decision block 414. Alternatively, if the decision of block 410 is negative, then flow proceeds to block 416 where the channel estimate is set to its value (e.g., ck) or, stated another way, is left alone. Flow then proceeds from block 416 to decision block 414. Channel estimator 308, or some other processor within the transceiver 300 as examples may effect the processes of blocks 410, 412, and 416. In addition, it is noted that these blocks further illustrate the relationships set forth by equation (2).

Decision block 414 then determines whether a current value of k has reached the channel length of N−1. If not, flow proceeds back to block 410 to repeat the processes in blocks 410, 412 and 416 until the condition of block 416 is met. It is noted that if k is initially set to zero, the process 400 illustrated in FIG. 4 effects comparison between the noise density threshold with all N number of channel estimates. It is noted, however, that the process 400 could be modified to be set to selected values of k if only portions of the channel estimates are compared with the noise density threshold. After the condition of 416 is met, flow proceeds to block 418 for termination of the process 400 for a particular channel estimation. It is further noted that in the method discussed above in connection with equation (3), the process 400 would be repeated for an M number of channel estimates, with each pass having a differently weighted adjusted noise density value (based on α).

Figure 5:
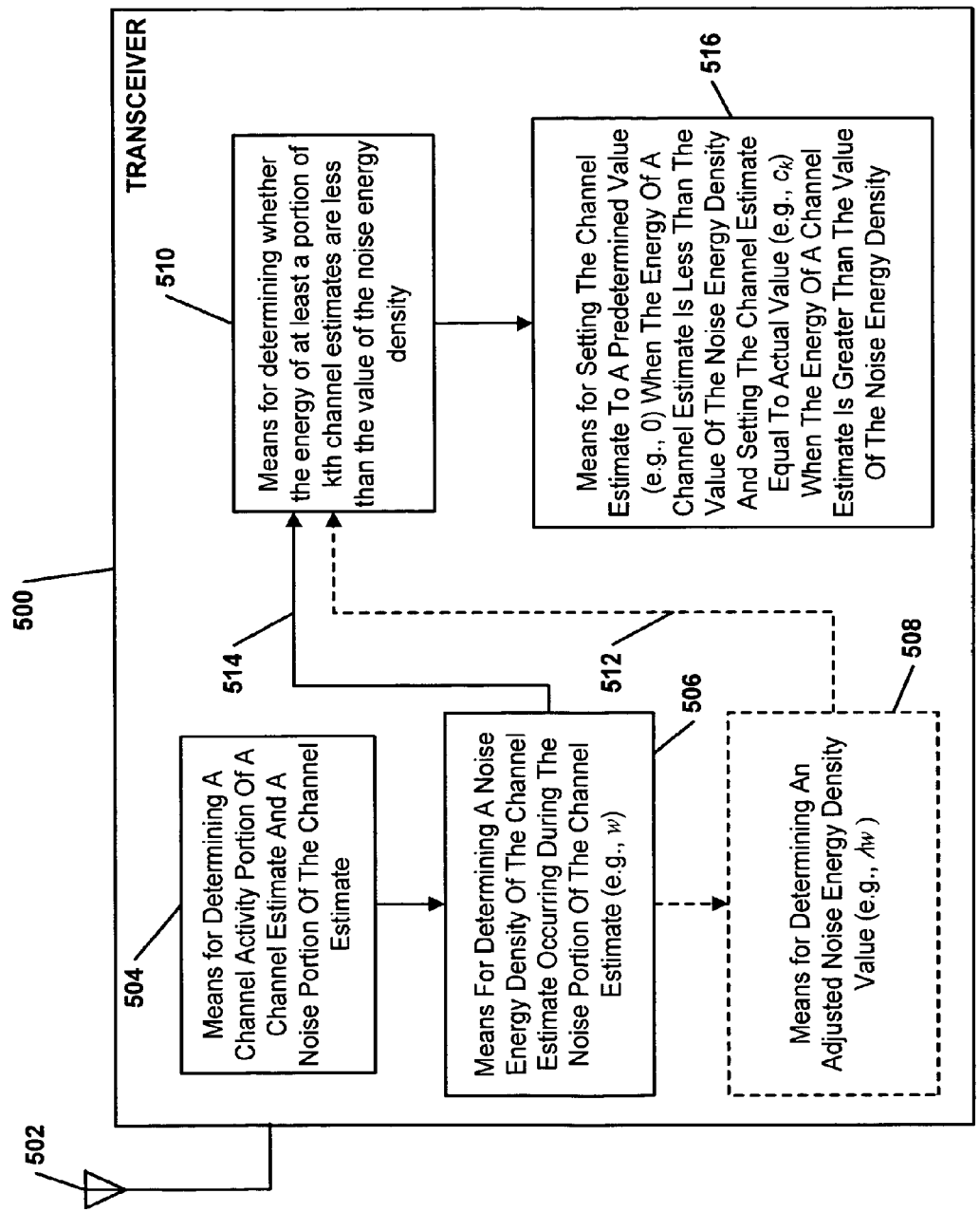
FIG. 5 is a block diagram of another transceiver apparatus for reducing noise in a channel estimation according to the present disclosure.

FIG. 5 is a block diagram of another transceiver apparatus 500 including means for reducing noise for a channel estimation according to the present disclosure. As illustrated, the wireless transceiver 500 includes connection to an antenna 502 for receiving and transmitting wireless communication signals. Within the device 500 are various means for effecting reduction of noise in a channel estimation, such as by the method disclosed in FIG. 4, as an example. In particular, the various means within transceiver apparatus 500 are used to effect reduction of noise in a channel estimation.

As shown, the apparatus 500 includes means for determining a channel activity portion of a channel estimate and a noise portion of the channel estimate 504. As an example, means 504 could be the channel estimator 308 shown in FIG. 3. Means 504 outputs the determination results to means for determining a noise energy density of the channel estimation occurring during the noise portion of the channel estimate (e.g., w) 506. This means 506 may also be implemented by channel estimator 308 and may determine noise energy density by utilizing equations (1) or (3), as examples. Once the noise energy density is determined, means 506 outputs this value to an optional means for determining an adjusted noise energy density value (e.g., λw) 508, shown dashed in FIG. 5. The adjusted noise energy density value is output to means for determining whether the energy density of at least a portion of the channel estimate is less than the value of the noise energy density 510 via a communication means 514. Alternatively, means 506 may be directly in communication with means 510 via a communication means 516 if no adjusted value of the noise energy density value is utilized. In such case, means 508 and communication means 512 are not included as indicated by the dashed lines in FIG. 5. It is noted that means 506 and 508 could be implemented with the channel estimator 308 shown in FIG. 3, as an example.

Means 510 performs a comparison of the channel energy to the noise energy density for at least a portion of the channel estimates. As discussed previously, this comparison may be made for only the channel estimates in the noise/interference zones of the channel estimation or for all channel estimates in the channel estimation, as examples. Further, means 510 may determine the comparison conditions set forth in equation (2) above. For each comparison determination effected by means 510, a result is communicated to means 516, which is for setting each channel estimate to a predetermined value (e.g., 0) when the energy density of a channel estimate is less than the value of the noise energy density and setting the channel estimate equal to actual estimate value (e.g., ck) when the energy density of a channel estimate is greater than the value of the weighted energy density. It is noted that if means 508 is utilized, the comparisons and determinations are based on an adjusted noise energy density. Further, for instances where the values of the channel energy density and the noise energy density are equal, the value of the channel estimate may be set to zero (0) as shown in equation (2), or may be set to the channel estimate according to other desired schemes.

Figure 6:
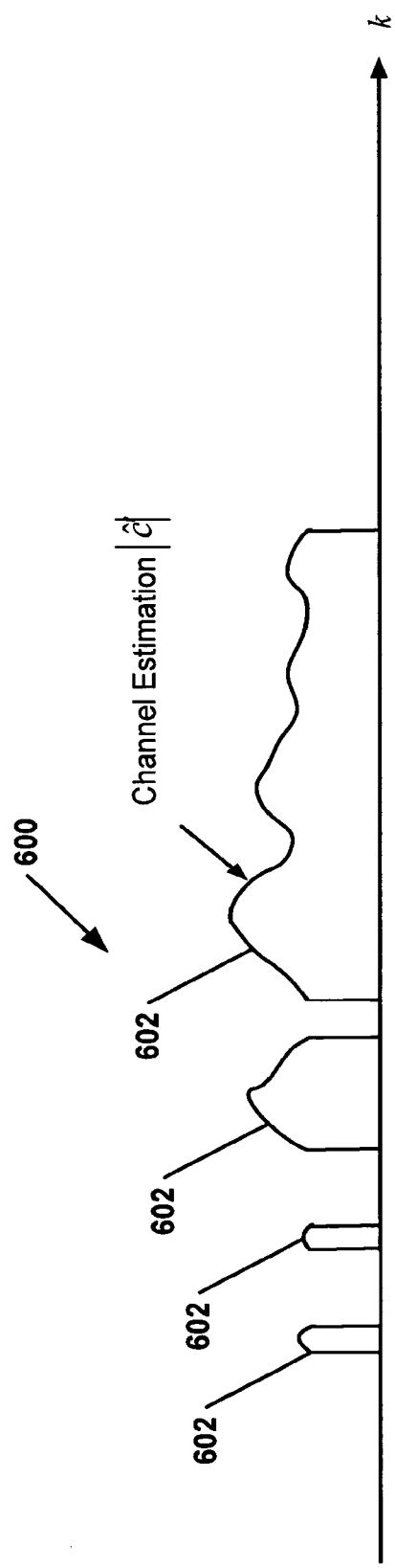
FIG. 6 is an exemplary plot of a resultant channel estimate after the reduction of noise/interference according to the present disclosure.

An example of the resultant channel estimate according to above-described methods and apparatus is illustrated in FIG. 6. Here the plot 600 shows that the channel estimate 602 only appears at values of k where the channel estimate energy of those values is greater than the noise density threshold 204 illustrated in FIG. 2. All other channel estimate values for the remaining k values are zeroed out in this example.

The methods or algorithms described in connection with the examples disclosed herein may be embodied directly in hardware, in a software module executed by a processor, firmware, or in a combination of two or more of these. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The examples described above are merely exemplary and those skilled in the art may now make numerous uses of, and departures from, the above-described examples without departing from the inventive concepts disclosed herein. Various modifications to these examples may be readily apparent to those skilled in the art, and the generic principles defined herein may be applied to other examples, e.g., in an instant messaging service or any general wireless data communication applications, without departing from the spirit or scope of the novel aspects described herein. Thus, the scope of the disclosure is not intended to be limited to the examples shown herein but is to be accorded the widest scope consistent with the principles and novel features disclosed herein. The word "exemplary" is used exclusively herein to mean "serving as an example, instance, or illustration." Any example described herein as "exemplary" is not necessarily to be construed as preferred or advantageous over other examples. Accordingly, the novel aspects described herein is to be defined solely by the scope of the following claims.

What I claim is:

1. A method for reducing noise in a channel estimation of a communication signal comprising:
    dividing a channel estimation in accordance with a zoning scheme to determine a channel activity portion of a channel estimation and a noise portion of the channel estimation based on channel activity in the channel estimation;
    determining a noise energy density value of channel estimates occurring during the noise portion of the channel estimation determined by the zoning scheme;
    comparing energy values of channel estimates for at least a portion of the channel estimation to the noise energy density value; and
    setting channel estimate values to a predetermined value for each channel estimate having an energy value less than the noise energy density value.

2. The method as defined in claim 1, further comprising: comparing energy values of all channel estimates in the channel estimation to the noise energy density value.

3. The method as defined in claim 1, wherein the at least a portion of the channel estimation includes the noise portion of the channel estimation.

4. The method as defined in claim 1, wherein determining the noise energy density value of channel estimates occurring during the noise portion of the channel estimation further includes adjusting the noise energy density value by a predetermined constant.

5. The method as defined in claim 4, wherein the predetermined constant is set to account for over estimation of the determined noise energy density value resulting from overlap between the channel activity portion of the channel estimation and the noise portion of the channel estimation.

6. The method as defined in claim 1, wherein the predetermined value is zero.

7. The method as defined in claim 1, wherein determining the noise energy density value of channel estimates occurring during, the noise portion of the channel estimation further includes utilizing channel estimates occurring in at least a noise portion of at least one previous channel estimation.

8. The method as defined in claim 1, further comprising:
    setting channel estimate values to the channel estimate value for each channel estimate having an energy density value greater than the noise energy density value.

9. The method as defined in claim 1, wherein the method is used for reducing noise of channel estimations for orthogonal frequency division multiplexed signals.

10. A method for reducing noise in a communications channel estimation comprising:
    dividing a channel estimation in accordance with a zoning scheme to determine a channel activity portion and a noise portion of a channel estimation based on channel activity in the channel estimation;
    determining a threshold noise level based on channel estimate values in the noise portion of the channel estimation determined by the zoning scheme;
    comparing at least a portion of channel estimate values in the channel estimation to the threshold noise level; and
    setting each of the at least a portion of channel estimate energy values being less than the threshold noise level to a predetermined value.

11. The method as defined in claim 10, further comprising:
    comparing energy values of all channel estimates in the channel estimation to the threshold noise level.

12. The method as defined in claim 10, wherein the at least a portion of the channel estimation includes the noise portion of the channel estimation.

13. The method as defined in claim 10, wherein determining the noise threshold value includes determining a noise energy density value of channel estimates occurring during the noise portion of the channel estimation.

14. The method as defined in claim 13, wherein the energy density value of channel estimates occurring during the noise portion of the channel estimation further includes adjusting the noise energy density value by a predetermined constant.

15. The method as defined in claim 14, wherein the predetermined constant is set to account for over estimation of the determined noise energy density value resulting from overlap between the channel activity portion of the channel estimation and the noise portion of the channel estimation.

16. The method as defined in claim 10, wherein the predetermined value is zero.

17. The method as defined in claim 10, wherein determining the noise threshold value based on channel estimates occurring during the noise portion of the channel estimation further includes utilizing channel estimates occurring in at least a noise portion of at least one previous channel estimation.

18. The method as defined in claim 10, further comprising: setting channel estimate values to the channel estimate value for each channel estimate having an energy greater than the noise threshold level.

19. The method as defined in claim 10, wherein the method is used for reducing noise of channel estimations for orthogonal frequency division multiplexed signals.

20. A non-transitory computer readable medium having instructions stored thereon, the stored instructions, when executed by a processor, cause the processor to perform a method to reduce noise in a communications channel estimation, the method comprising:
   dividing a channel estimation in accordance with a zoning scheme to determine a channel activity portion of a channel estimation and a noise portion of the channel estimation based on channel activity tracked in the channel estimation;
   determining a noise energy density value of channel estimates occurring during the noise portion of the channel estimation determined by the zoning scheme;
   comparing energy values of channel estimates for at least a portion of the channel estimation to the noise energy density value; and
   setting channel estimate values to a predetermined value for each channel estimate having an energy value less than the noise energy density value.

21. The non-transitory computer readable medium as defined in claim 20, wherein the method further includes comparing energy values of all channel estimates in the channel estimation to the noise energy density value.

22. The non-transitory computer readable medium as defined in claim 20, wherein the method further includes the at least a portion of the channel estimation including the noise portion of the channel estimation.

23. The non-transitory computer readable medium as defined in claim 20, wherein determining the noise energy density value of channel estimates occurring during the noise portion of the channel estimation further includes adjusting the noise energy density value by a predetermined constant.

24. The non-transitory computer readable medium as defined in claim 23, wherein the predetermined constant is set to account for over estimation of the determined noise energy density value resulting from overlap between the channel activity portion of the channel estimation and the noise portion of the channel estimation.

25. The non-transitory computer readable medium as defined in claim 20, wherein the predetermined value is zero.

26. The non-transitory computer readable medium as defined in claim 20, wherein determining the noise energy density value of channel estimates occurring during the noise portion of the channel estimation further includes utilizing channel estimates occurring in at least a noise portion of at least one previous channel estimation.

27. The non-transitory computer readable medium as defined in claim 20, wherein the method further includes setting channel estimate values to the channel estimate value for each channel estimate having an energy density value greater than the noise energy density value.

28. The non-transitory computer readable medium as defined in claim 20, wherein the computer readable medium is used in a transceiver for reducing noise of channel estimations for orthogonal frequency division multiplexed signals.

29. A non-transitory computer readable medium having instructions stored thereon, the stored instructions, when executed by a processor, cause the processor to perform a method to reduce noise in a communications channel estimation, the method comprising:
   dividing a channel estimation in accordance with a zoning scheme to determine a channel activity portion and a noise portion of a channel estimation based on channel activity in the channel estimation;
   determining a threshold noise level based on channel estimate values in the noise portion of the channel estimation determined by the zoning scheme;
   comparing at least a portion of channel estimate values in the channel estimation to the threshold noise level; and
   setting each of the at least a portion of channel estimate energy values being less than the threshold noise level to a predetermined value.

30. The non-transitory computer readable medium as defined in claim 29, wherein the method further includes comparing energy values of all channel estimates in the channel estimation to the threshold noise level.

31. The non-transitory computer readable medium as defined in claim 29, wherein the at least a portion of the channel estimation includes the noise portion of the channel estimation.

32. The non-transitory computer readable medium as defined in claim 31, wherein determining the noise threshold value includes determining a noise energy density value of channel estimates occurring during the noise portion of the channel estimation.

33. The non-transitory computer readable medium as defined in claim 32, wherein the energy density value of channel estimates occurring during the noise portion of the channel estimation further includes adjusting the noise energy density value by a predetermined constant.

34. The non-transitory computer readable medium as defined in claim 33, wherein the predetermined constant is set to account for over estimation of the determined noise energy density value resulting from overlap between the channel activity portion of the channel estimation and the noise portion of the channel estimation.

35. The non-transitory computer readable medium as defined in claim 29, wherein the predetermined value is zero.

36. The non-transitory computer readable medium as defined in claim 29, wherein determining the noise threshold value based on channel estimates occurring during the noise portion of the channel estimation further includes utilizing channel estimates occurring in at least a noise portion of at least one previous channel estimation.

37. The non-transitory computer readable medium as defined in claim 29, further comprising:
   setting channel estimate values to the channel estimate value for each channel estimate having an energy greater than the noise threshold level.

38. The non-transitory computer readable medium as defined in claim 29, wherein the computer readable medium is used in a transceiver for reducing noise of channel estimations for orthogonal frequency division multiplexed signals.

39. A transceiver apparatus configured to reduce noise in a channel estimation comprising:
   a channel estimator processor configured to:
      divide a channel estimation in accordance with a zoning scheme to determine a channel activity portion of a channel estimation and a noise portion of the channel estimation based on channel activity in the channel estimation;
      determine a noise energy density value of channel estimates occurring during the noise portion of the channel estimation determined based on zoning scheme;
      compare energy values of channel estimates for at least a portion of the channel estimation to the noise energy density value; and set channel estimate values to a predetermined value for each channel estimate having an energy value less than the noise energy density value.

40. The transceiver as defined in claim 39, wherein the processor is further configured to compare energy values of all channel estimates in the channel estimation to the noise energy density value.

41. The transceiver as defined in claim 39, wherein the at least a portion of the channel estimation includes the noise portion of the channel estimation.

42. The transceiver as defined in claim 39, wherein the processor is configured to adjust the noise energy density value by a predetermined constant in order to determine the noise energy density value of channel estimates occurring during the noise portion of the channel estimation.

43. The transceiver as defined in claim 42, wherein the processor is further configured to set the predetermined constant to account for over estimation of the determined noise energy density value resulting from overlap between the channel activity portion of the channel estimation and the noise portion of the channel estimation.

44. The transceiver as defined in claim 39, wherein the predetermined value is zero.

45. The transceiver as defined in claim 39, wherein the processor is further configured to use channel estimates occurring in at least the noise portion of at least one previous channel estimation to determine the noise energy density value of channel estimates occurring during a noise portion of the channel estimation further includes.

46. The transceiver as defined in claim 39, wherein the processor is further configured to set channel estimate values to the channel estimate value for each channel estimate having an energy density value greater than the noise energy density value.

47. The transceiver as defined in claim 39, wherein the transceiver is configured to receive orthogonal frequency division multiplexed signals.

48. A transceiver apparatus configured to reduce noise in a channel estimation comprising:
   a channel estimator processor configured to:
      divide a channel estimation in accordance with a zoning scheme to determine a channel activity portion and a noise portion of a channel estimation based on channel activity in the channel estimation;
      determine a threshold noise level based on channel estimate values in the noise portion of the channel estimation determined by the zoning scheme;
      compare at least a portion of channel estimate values in the channel estimation to the threshold noise level; and
      set each of the at least a portion of channel estimate energy values being less than the threshold noise level to a predetermined value.

49. The transceiver as defined in claim 48, wherein the processor is further configured to compare energy values of all channel estimates in the channel estimation to the threshold noise level.

50. The transceiver as defined in claim 48, wherein the at least a portion of the channel estimation includes the noise portion of the channel estimation.

51. The transceiver as defined in claim 48, wherein the processor in further configured to determine a noise energy density value of channel estimates occurring during the noise portion of the channel estimation in order to determine the noise threshold value.

52. The transceiver as defined in claim 51, wherein the processor is further configured to adjust the noise energy density value by a predetermined constant in order to determine the energy density value of channel estimates occurring during the noise portion of the channel estimation.

53. The transceiver as defined in claim 52, wherein the processor is configured to set predetermined constant to account for over estimation of the determined noise energy density value resulting from overlap between the channel activity portion of the channel estimation and the noise portion of the channel estimation.

54. The transceiver as defined in claim 48, wherein the predetermined value is zero.

55. The transceiver as defined in claim 48, wherein the processor is further configured to use channel estimates occurring in at least a noise portion of at least one previous channel estimation in order to determine the noise threshold value based on channel estimates occurring during the noise portion of the channel estimation.

56. The transceiver as defined in claim 48, wherein the processor is further configured to set channel estimate values to the channel estimate value for each channel estimate having an energy greater than the noise threshold level.

57. The transceiver as defined in claim 48, wherein the transceiver is configured to receive orthogonal frequency division multiplexed signals.

58. An apparatus for resolving timing in a wireless communication device comprising:
   means for dividing a channel estimation in accordance with a zoning scheme for determining a channel activity portion of a channel estimate and a noise portion of the channel estimate based on channel activity in the channel estimation;
   means for determining a noise energy density of the channel estimate occurring during the noise portion of the channel estimate determined by the zoning scheme;
   means for determining whether energy of at least a portion of kth channel estimates are less than a value of the noise energy density; and
   means for setting the channel estimate to a predetermined value when the energy of a channel, estimate is less than the value of the noise energy density.

59. The apparatus as defined in claim 58, further comprising:
   means for setting the channel estimate equal to an actual channel estimate when the energy of a channel estimate is greater than the value of the noise energy density.

60. The apparatus as defined in claim 58, further comprising: means for determining an adjusted noise energy density value.

61. The method of claim 1, further comprising performing time-domain channel estimation to obtain the channel estimation.

62. The method of claim 1, further comprising dividing a channel estimation in accordance with the zoning scheme depending on timing tracking schemes, length of the channel estimation, and maximum channel spread of the channel estimation.

63. The apparatus as defined in claim 58, further comprising:
   means for comparing energy values of all channel estimates in the channel estimation to the noise energy density value.

64. The apparatus as defined in claim 58, wherein the at least a portion of the channel estimation includes the noise portion of the channel estimation.

65. The apparatus as defined in claim 58, wherein the means for determining the noise energy density of the channel estimate occurring during the noise portion of the channel estimate comprises means for adjusting the noise energy density value by a predetermined constant.

66. The apparatus as defined in claim 65, wherein the predetermined constant is set to account for over estimation of the determined noise energy density value resulting from overlap between the channel activity portion of the channel estimation and the noise portion of the channel estimate.

67. The apparatus as defined in claim 58, wherein the predetermined value is zero.

68. The apparatus as defined in claim 58, wherein the means for determining the noise energy density of the channel estimate occurring during the noise portion of the channel estimate comprises means for means for utilizing channel estimates occurring in at least the noise portion of at least one previous channel estimation.

69. The apparatus as defined in claim 58, further comprising means for reducing noise of channel estimations for orthogonal frequency division multiplexed signals.

70. The apparatus as defined in claim 58, further comprising means for performing time-domain channel estimation to obtain the channel estimation.

71. The apparatus as defined in claim 58, further comprising means for dividing a channel estimation in accordance with the zoning scheme depending on timing tracking schemes, length of the channel estimation, and maximum channel spread of the channel estimation.

72. An apparatus for resolving timing in a wireless communication device comprising:
  means for dividing a channel estimation in accordance with a zoning scheme to determine a channel activity portion and a noise portion of a channel estimation based on channel activity in the channel estimation;
  means for determining a threshold noise level based on channel estimate values in the noise portion of the channel estimation determined by the zoning scheme;
  means for comparing at least a portion of channel estimate values in the channel estimation to the threshold noise level; and
  means for setting each of the at least a portion of channel estimate energy values being less than the threshold noise level to a predetermined value.

73. The apparatus as defined in claim 72, further comprising:
  means for comparing energy values of all channel estimates in the channel estimation to the noise energy density value.

74. The apparatus as defined in claim 72, wherein the at least a portion of the channel estimation includes the noise portion of the channel estimation.

75. The apparatus as defined in claim 72, wherein the means for determining the noise energy density of the channel estimate occurring during the noise portion of the channel estimate comprises means for adjusting the noise energy density value by a predetermined constant.

76. The apparatus as defined in claim 75, wherein the predetermined constant is set to account for over estimation of the determined noise energy density value resulting from overlap between the channel activity portion of the channel estimation and the noise portion of the channel estimate.

77. The apparatus as defined in claim 72, wherein the predetermined value is zero.

78. The apparatus as defined in claim 72, wherein the means for determining the noise energy density of the channel estimate occurring during the noise portion of the channel estimate comprises means for means for utilizing channel estimates occurring in at least the noise portion of at least one previous channel estimation.

79. The apparatus as defined in claim 72, further comprising means for reducing noise of channel estimations for orthogonal frequency division multiplexed signals.

80. The apparatus as defined in claim 72, further comprising means for performing time-domain channel estimation to obtain the channel estimation.

81. The apparatus as defined in claim 72, further comprising means for dividing a channel estimation in accordance with the zoning scheme depending on timing tracking schemes, length of the channel estimation, and maximum channel spread of the channel estimation.

* * * * *